US011386895B2

(12) United States Patent
Lee et al.

(10) Patent No.: US 11,386,895 B2
(45) Date of Patent: Jul. 12, 2022

(54) SPEECH PROCESSING METHOD AND APPARATUS THEREFOR

(71) Applicant: LG ELECTRONICS INC., Seoul (KR)

(72) Inventors: Kwang Yong Lee, Yongin (KR); Yi Reun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 16/695,094

(22) Filed: Nov. 25, 2019

(65) Prior Publication Data

US 2021/0097989 A1 Apr. 1, 2021

(30) Foreign Application Priority Data

Oct. 1, 2019 (KR) .......................... 10-2019-0121831

(51) Int. Cl.
*G10L 15/00* (2013.01)
*G10L 15/22* (2006.01)
*G06F 40/211* (2020.01)
*G06F 40/295* (2020.01)
*G06F 40/30* (2020.01)

(52) U.S. Cl.
CPC ............ *G10L 15/22* (2013.01); *G06F 40/211* (2020.01); *G06F 40/295* (2020.01); *G06F 40/30* (2020.01); *G10L 2015/223* (2013.01)

(58) Field of Classification Search
None
See application file for complete search history.

(56) References Cited

U.S. PATENT DOCUMENTS

| 10,304,444 | B2* | 5/2019 | Mathias | G10L 15/02 |
| 2019/0258461 | A1* | 8/2019 | Li | G06F 40/237 |
| 2019/0371296 | A1* | 12/2019 | Iwase | G06F 40/237 |
| 2021/0158815 | A1* | 5/2021 | Lee | G06V 10/82 |

FOREIGN PATENT DOCUMENTS

| KR | 101057705 | 8/2011 |
| KR | 101985793 | 5/2019 |

* cited by examiner

*Primary Examiner* — Satwant K Singh
(74) *Attorney, Agent, or Firm* — Lee Hong Degerman Kang & Waimey

(57) ABSTRACT

Disclosed are a speech processing method and speech processing apparatus which execute an installed artificial intelligence (AI) algorithm and/or machine learning algorithm to perform speech processing to enable the speech processing apparatus, a user terminal, and a server to communicate with each other in a 5G communication environment. The speech processing method according to an exemplary embodiment of the present disclosure includes converting a user's spoken utterance into a user utterance text, discovering a domain, an intent, and at least one named entity of the user utterance text, determining whether the user's spoken utterance is a complete spoken utterance or an incomplete spoken utterance, generating a spoken query utterance and feeding the generated spoken query utterance back to the user when the user's spoken utterance is an incomplete spoken utterance, and constructing a complete spoken utterance by receiving a user's spoken response utterance which responds to the spoken query utterance.

17 Claims, 8 Drawing Sheets

FIG. 5

TYPES OF SLOTS 510

| AIR CONDITIONER | TEMPERATURE | BY | 5 DEGREES | FURTHER | DECREASE | |
|---|---|---|---|---|---|---|
| ? | ? | o | ? | o | o | (511) |
| Prd | ? | o | ? | o | o | (512) |
| ? | Temp | o | ? | o | o | (513) |
| ? | Temp | o | Num | o | o | (514) |
| Prd | Temp | o | ? | o | o | (515) |

STATE TABLE 520

| DOMAIN | INTENT | REQUIRED SLOTS | ACTION STATE | |
|---|---|---|---|---|
| AIR CONDITIONER/WASHING MACHINE/TV/MOBILE PHONE | Temp_down Volume_down | Prd | Request_domain | (521) |
| AIR CONDITIONER | Temp_down Wind_down | Temp | Request_intent | (522) |
| AIR CONDITIONER/WASHING MACHINE/ | Temp_down | Prd | Request_domain | (523) |
| AIR CONDITIONER/WASHING MACHINE/ | Temp_down | Prd | Request_domain | (524) |
| AIR CONDITIONER | Temp_down | Num | Request_entity | (525) |

530

| QUERY TEXT TO BE FED BACK | |
|---|---|
| IN WHICH DEVICE SHOULD THE DECREASE BE PERFORMED? | (531) |
| WHAT SHOULD BE DECREASED IN THE AIR CONDITIONER? | (532) |
| IN WHICH DEVICE SHOULD THE DECREASE BE PERFORMED? | (533) |
| IN WHICH DEVICE SHOULD THE DECREASE BE PERFORMED? | (534) |
| HOW MANY DEGREES SHOULD THE AIR CONDITIONER TEMPERATURE BE DECREASED? | (535) |

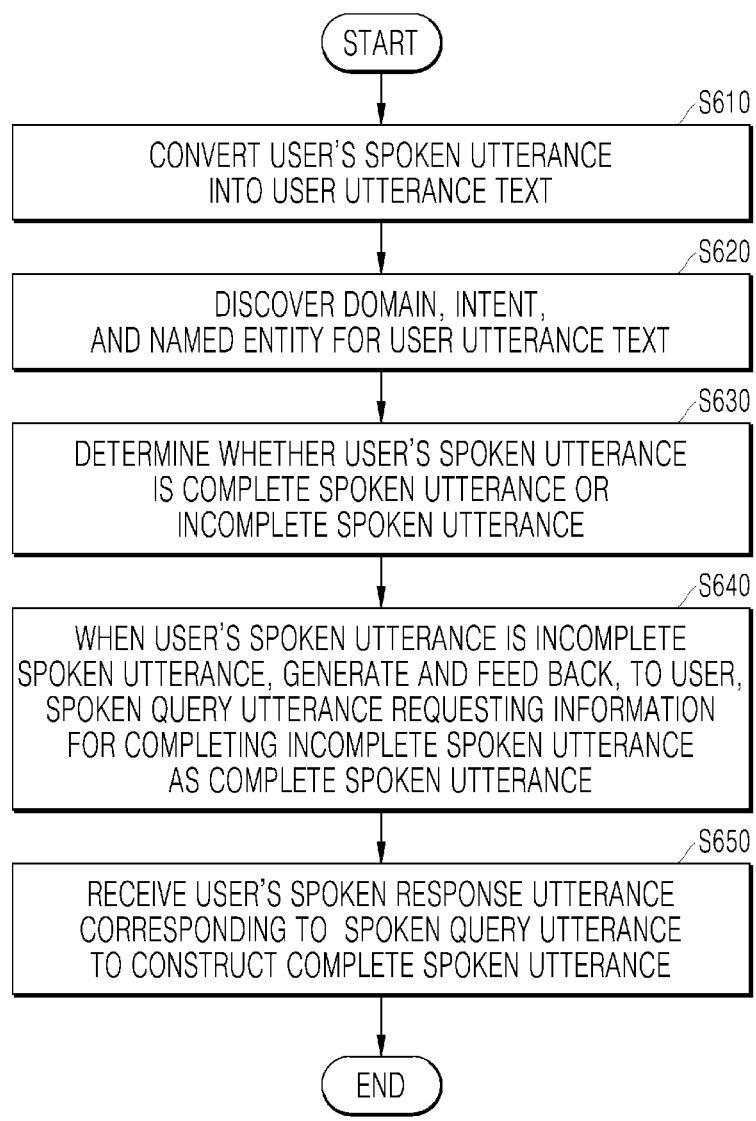

SPEECH PROCESSING METHOD AND APPARATUS THEREFOR

CROSS-REFERENCE TO RELATED APPLICATION

Pursuant to 35 U.S.C. § 119(a), this application claims the benefit of earlier filing date and right of priority to Korean Patent Application No. 10-2019-0121831, filed on Oct. 1, 2019, the contents of which are hereby incorporated by reference herein in its entirety.

BACKGROUND

1. Technical Field

The present disclosure relates to a speech processing method and a speech processing apparatus, and more particularly, to a speech processing method and a speech processing apparatus for receiving a spoken response utterance corresponding to a spoken query utterance fed back to a user, and determining any one electronic device to be operated and cause the determined electronic device to operate, when a voice command included in a spoken utterance of the user can be processed by a plurality of electronic devices.

2. Description of Related Art

As technology continues to advance, various services using speech recognition technology have been introduced in a number of fields in recent years. Speech recognition technology can be understood as a series of processes of understanding utterances spoken by a speaker and converting the spoken utterance to text data recognizable and usable by computers. Furthermore, speech recognition services using such speech recognition technology may include a series of processes for recognizing a user's spoken utterance and providing a service appropriate thereto.

Korean Patent Registration No. 10-1057705 (published on Aug. 11, 2011, hereinafter referred to as "related art 1") discloses a speech communication device and method and a robot device. The speech communication device having a function for conversing with a conversation counterpart is provided with: a speech recognition means for recognizing an utterance of the conversation counterpart; a conversation control means for controlling a conversation with the conversation counterpart according to a recognition result from the speech recognition means; and a tracking control means for tracking the presence of the conversation counterpart on the basis of one or both of a recognition result from the image recognition means and the recognition result from the speech recognition means, wherein the conversation control means controls conversation so as to continue in synchronization with the tracking of the tracking control means.

Korean Patent Registration No. 10-1985793 (published on May 29, 2019, hereinafter referred to as "related art 2") discloses a method, a system, and a non-transitory computer-readable recording medium for providing a conversation service using an autonomous robot which provides a service of intimate conversation with a user on the basis of at least one of personal attributes of the user or the reliability of the personal attributes.

The disclosures of related art 1 and related art 2 are merely for enabling smooth voice conversations with conversation counterparts, and do not make it possible to determine an electronic device to be operated when a voice command included in a spoken utterance of a user can be processed by a plurality of electronic devices.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

An aspect of the present disclosure is to address the shortcoming associated with some related art in which it is not possible to determine an electronic device to be operated when a voice command included in a spoken utterance of a user can be processed by a plurality of electronic devices.

Another aspect of the present disclosure is to complete an incomplete spoken utterance as a complete spoken utterance by receiving a spoken response utterance corresponding to a spoken query utterance fed back to a user, when an incomplete spoken utterance is received from the user.

Another aspect of the present disclosure is to determine and operate any one device among a plurality of electronic devices by completing an incomplete spoken utterance as a complete spoken utterance by receiving a spoken response utterance corresponding to a spoken query utterance fed back to a user, when the incomplete spoken utterance is received from the user.

Another aspect of the present disclosure is to address the shortcoming associated with some related art in which it is not possible to determine an electronic device to be operated when a voice command included in a spoken utterance of a user can be processed by a plurality of electronic devices, while using optimal process resources.

A speech processing method according to an embodiment of the present disclosure may include receiving a spoken response utterance corresponding to a spoken query utterance fed back to a user, and determining any one electronic device to be operated and causing the determined electronic device to operate, when a voice command included in a spoken utterance of the user can be processed by a plurality of electronic devices.

In detail, the speech processing method according to this embodiment of the present disclosure may include converting a user's spoken utterance including a voice command into a user utterance text, discovering a domain to which the user utterance text belongs and an intent of the user utterance text by performing syntactic analysis or semantic analysis on the user utterance text and discovering at least one named entity as a result of recognizing a named entity included in the user utterance text, determining whether the user's spoken utterance is a complete spoken utterance or an incomplete spoken utterance according to a result of discovering the domain, the intent, and the named entity, generating a spoken query utterance that requests information for completing the incomplete spoken utterance as a complete spoken utterance and feeding the generated spoken query utterance back to the user when the user's spoken utterance is an incomplete spoken utterance, and constructing a complete spoken utterance by receiving a user's spoken response utterance which responds to the spoken query utterance.

Through the speech processing method according to the present embodiment, when an incomplete spoken utterance is received from a user, a speech recognition process may be performed quickly and accurately by determining and operating any one device among a plurality of electronic devices by completing an incomplete spoken utterance as a complete spoken utterance by receiving a spoken response utterance corresponding to a spoken query utterance fed back to the user.

The converting may include converting, into the user utterance text, the user's spoken utterance including a voice command for instructing operation of any one electronic device among a plurality of electronic devices.

The discovering may include discovering the domain designating a product type of an electronic device to be operated by the user, the intent indicating how the electronic device is to be operated, and the named entity including a noun or number having a unique meaning indicated in the user utterance text.

The determining may include determining essential slots including a first slot related to the domain, a second slot related to the intent, and a third slot related to an amount-related named entity from the user utterance text, determining that the user's spoken utterance is a complete spoken utterance when the essential slots are all filled with a named entity in the user utterance text, and determining that the user's spoken utterance is an incomplete spoken utterance when an essential slot lacking a named entity is present in the user utterance text.

The generating the spoken query utterance may include determining a slot lacking a named entity among required slots in the user utterance text on the basis of a pre-established state table including a required slot in a user command text according to the domain and the intent, and a query text to be requested corresponding to the required slot; generating the query text corresponding to the slot lacking a named entity on the basis of the state table; and converting the generated query text into a spoken query utterance and feeding the spoken query utterance back to the user.

Furthermore, in the speech processing method according to the present embodiment, a first slot among the required slots in the user utterance text is related to the domain, a second slot among the required slots in the user utterance text is related to the intent, and a third slot among the required slots in the user utterance text is related to an amount-related named entity, and the determining a slot lacking a named entity may include determining the slot lacking a named entity in an order of the first slot, the second slot, and the third slot, among the required slots in the user utterance text.

The generating the query text may include generating a query text related to domain when a named entity is missing in the first slot, generating a query text related to intent when a named entity is missing in the second slot after the first slot is filled with a named entity, and generating a query text related to a slot lacking an amount-related named entity when a named entity is missing in the third slot after the second slot is filled with a named entity.

The constructing a complete spoken utterance may include filling essential slots lacking a named entity with a named entity by repeating feedback of the spoken query utterance and reception of the user's spoken response utterance, and completing, as the complete spoken utterance, a user's spoken utterance in which the essential slots lacking a named entity are all filled with a named entity.

Furthermore, the speech processing method according to the present embodiment may include determining and operating any one electronic device among a plurality of electronic devices in response to a command included in the complete spoken utterance, when the user's spoken utterance is completed as the complete spoken utterance.

A speech processing apparatus according to an embodiment of the present disclosure may include one or more processors configured to: convert a user's spoken utterance including a voice command into a user utterance text; discover a domain to which the user utterance text belongs and an intent of the user utterance text by performing syntactic analysis or semantic analysis on the user utterance text, and discover at least one named entity as a result of recognizing a named entity included in the user utterance text; determine whether the user's spoken utterance is a complete spoken utterance or an incomplete spoken utterance according to a result of discovering the domain, the intent, and the named entity; generate a spoken query utterance that requests information for completing the incomplete spoken utterance as a complete spoken utterance and feed the generated spoken query utterance back to the user, when the user's spoken utterance is an incomplete spoken utterance; and construct a complete spoken utterance by receiving a user's spoken response utterance which responds to the spoken query utterance.

The one or more processors may be configured to, when converting the user's spoken utterance including a voice command into the user utterance text, convert, into the user utterance text, the user's spoken utterance including a voice command instructing operation of any one electronic device among a plurality of electronic devices.

The one or more processors may be configured to, when discovering the domain, the intent, and the named entity, discover the domain designating a product type of an electronic device to be operated by the user, the intent indicating how the electronic device is to be operated, and the named entity comprising a noun or number having a unique meaning indicated in the user utterance text.

Furthermore, when determining whether the user's spoken utterance is a complete spoken utterance or an incomplete spoken utterance, the one or more processors may be configured to: determine essential slots including a first slot related to the domain, a second slot related to the intent, and a third slot related to an amount-related named entity from the user utterance text; determine that the user's spoken utterance is a complete spoken utterance when the essential slots are all filled with a named entity in the user utterance text; and determine that the user's spoken utterance is an incomplete spoken utterance when an essential slot lacking a named entity is present in the user utterance text.

Furthermore, when feeding the spoken query utterance back to the user, the one or more processors may be configured to: determine a slot lacking a named entity among required slots in the user utterance text on the basis of a pre-established state table including a required slot in a user command text according to the domain and the intent, and a query text to be requested corresponding to the required slot; generate the query text corresponding to the slot lacking a named entity on the basis of the state table; and convert the generated query text into a spoken query utterance and feed the spoken query utterance back to the user.

Furthermore, in the speech processing apparatus according to the present embodiment, a first slot among the required slots in the user utterance text is related to the domain, a second slot among the required slots in the user utterance text is related to the intent, and a third slot among the required slots in the user utterance text is related to an amount-related named entity, and, when determining the slot lacking a named entity, the one or more processors may be configured to determine the slot lacking a named entity in an order of the first slot, the second slot, and the third slot, among the required slots in the user utterance text.

When generating the query text, the one or more processors may be configured to: generate a query text related to the domain when a named entity is missing in the first slot; generate a query text related to the intent when a named entity is missing in the second slot after the first slot is filled with a named entity; and generate a query text related to a slot lacking an amount-related named entity when a named entity is missing in the third slot after the second slot is filled with a named entity.

Furthermore, when constructing the complete spoken utterance, the one or more processors may be configured to: fill essential slots lacking a named entity with a named entity by repeating feedback of the spoken query utterance and reception of the user's spoken response utterance; and complete, as the complete spoken utterance, a user's spoken utterance in which the essential slots lacking a named entity are all filled with a named entity.

The one or more processors may be further configured to determine and operate any one electronic device among a plurality of electronic devices in response to a command included in the complete spoken utterance, when the user's spoken utterance is completed as the complete spoken utterance.

Apart from those described above, another method and another system for implementing the present disclosure, and a computer-readable recording medium having a computer program stored therein to perform the method may be further provided.

Other aspects and features in addition those described above will become clear from the accompanying drawings, the claims, and the detailed description of the present disclosure.

According to the present disclosure, when an incomplete spoken utterance is received from a user, speech recognition performance may be improved by completing the incomplete spoken utterance as a complete spoken utterance by receiving a spoken response utterance corresponding to a spoken query utterance fed back to the user.

Furthermore, when an incomplete spoken utterance is received from a user, a speech recognition process may be performed quickly and accurately by determining and operating any one device among a plurality of electronic devices by completing the incomplete spoken utterance as a complete spoken utterance by receiving a spoken response utterance corresponding to a spoken query utterance fed back to a user.

In addition, although the speech processing apparatus is a mass-produced product, the user may recognize the speech processing apparatus as a user-customized apparatus. Therefore, the speech processing apparatus may have effects of a user-customized apparatus.

Also, the present disclosure may increase user satisfaction by providing various services through speech recognition processing, and may perform the speech recognition processing rapidly and accurately.

Furthermore, according to the present disclosure, power efficiency of a speech processing apparatus can be improved by using only optimal process resources to determine and operate any one electronic device, when a voice command included in a spoken utterance of a user can be processed by a plurality of electronic devices.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 5 is an exemplary diagram illustrating a query text to be fed back through state table matching with regard to the user's incomplete spoken utterance in FIG. 3; and FIG. 6 is a flowchart illustrating a speech processing method according to an embodiment of the present disclosure.

DETAILED DESCRIPTION

Figure 1:
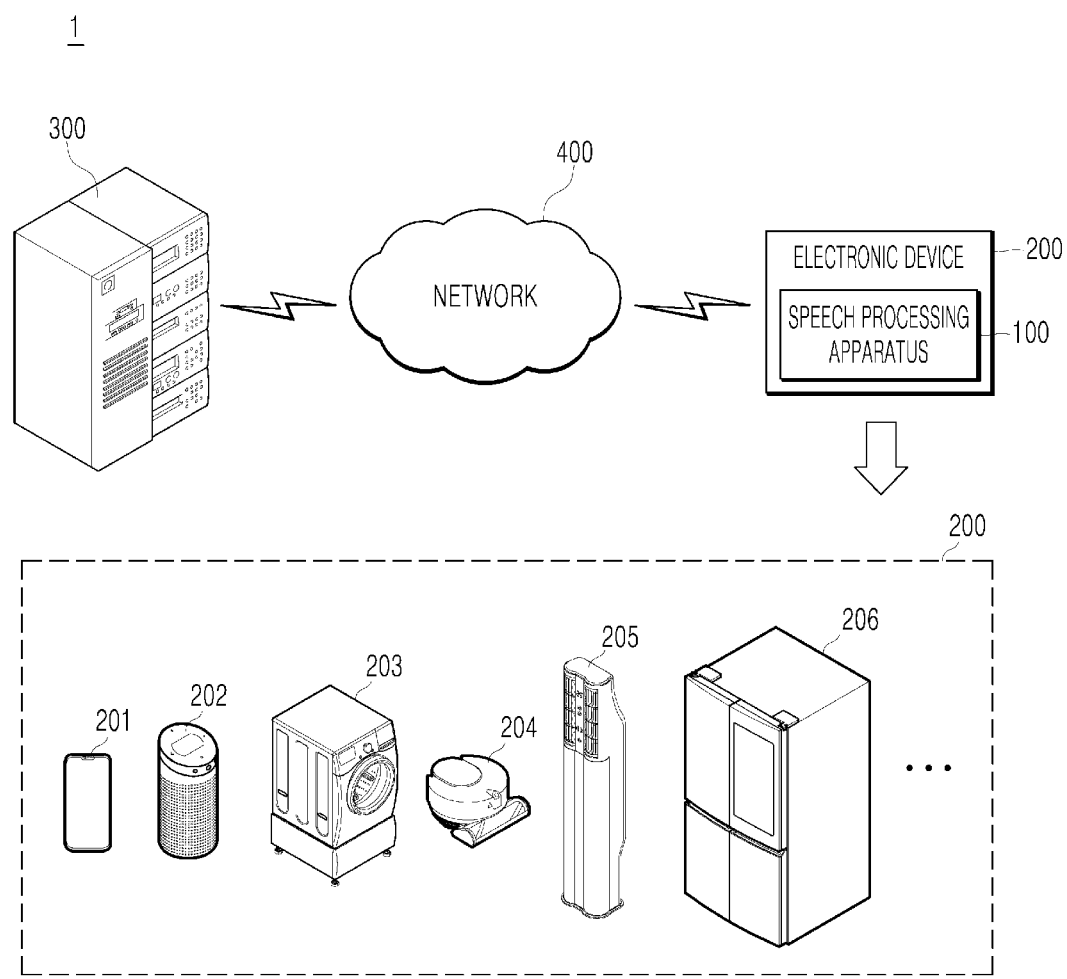
FIG. 1 is an exemplary diagram illustrating a speech processing environment including an electronic device having a speech processing apparatus according to an embodiment of the present disclosure, a server, and a network for connecting the foregoing elements.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally used only to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is an exemplary diagram illustrating a speech processing environment including an electronic device having a speech processing apparatus according to an embodiment of the present disclosure, a server, and a network for connecting the foregoing elements. Referring to FIG. 1, a speech processing environment 1 may include an electronic device 200 including a speech processing apparatus 100, a server 300, and a network 400. The electronic device 200 including the speech processing apparatus 100 and the server 300 may be connected to each other in a 5G communication environment.

The speech processing apparatus 100 may receive utterance information of a user, and may provide a speech recognition service through recognition and analysis. Here, the speech recognition service may include receiving the utterance information of the user to distinguish a wake-up word and a spoken utterance, and outputting a result of executing a speech recognition process on the utterance information so that the result may be recognized by the user.

In the present embodiment, the utterance information may include a wake-up word and a spoken utterance. The wake-up word may be a specific command that activates the speech recognition functionality of the speech processing apparatus 100. The speech recognition functionality is activated only when the wake-up word is present in the utterance information, and therefore, when the utterance information does not contain the wake-up word, the speech recognition functionality remains in an inactive state (for example, in a sleep mode). Such a wake-up word may be preset and stored in a memory (160 in FIG. 2) that will be described below.

Furthermore, the spoken utterance, which is processed after the speech recognition functionality of the speech processing apparatus 100 is activated by the wake-up word, may include a voice command that may be processed by the speech processing apparatus 100 to generate an output. For example, when the utterance information of the user is "Hi LG, turn on the air conditioner", the wake-up word may be "Hi LG", and the spoken utterance may be "turn on the air conditioner". The speech processing apparatus 100 may determine presence of the wake-up word from the utterance information of the user, and may control an air conditioner 205, as the electronic device 200, by analyzing the spoken utterance.

In the present embodiment, when the voice command included in the spoken utterance of the user is processable by a plurality of electronic devices 200 in a state in which the speech recognition functionality is activated after receiving the wake-up word, the speech processing apparatus 100 may determine any one electronic device 200, and may operate the determined electronic device 200.

To this end, the speech processing apparatus 100 may convert the spoken utterance of the user which includes a voice command into a user utterance text. The speech processing apparatus 100 may perform syntactic analysis or semantic analysis on the user utterance text to discover a domain to which the user utterance text belongs and an intent of the user utterance text, and may discover at least one named entity as a result of recognizing a named entity included in the user utterance text. The speech processing apparatus 100 may determine whether the spoken utterance of the user is a complete spoken utterance or an incomplete spoken utterance according to the domain, the intent, and the result of discovering the named entity. When the spoken utterance of the user is incomplete, the speech processing apparatus 100 may generate a spoken query utterance that requests information for completing the incomplete spoken utterance as a complete spoken utterance, and may feed the spoken query utterance back to the user. The speech processing apparatus 100 may construct the complete spoken utterance by receiving a spoken response utterance of the user which responds to the spoken query utterance. When the spoken utterance of the user is completed as the complete spoken utterance, the speech processing apparatus 100 may determine and operate any one electronic device among a plurality of electronic devices in response to the command included in the complete spoken utterance.

In the present embodiment, the speech processing apparatus 100 may be included in the electronic device 200. The electronic device 200 may include various devices compatible with the Internet of things (IoT), such as a user terminal 201, an artificial intelligence speaker 202 serving as a hub for connecting other electronic devices to the network 400, a washing machine 203, a robot cleaner 204, an air conditioner 205, and a refrigerator 206. However, the electronic device 200 is not limited to the examples illustrated in FIG. 1.

The user terminal 201, among such electronic devices 200, may receive a service for driving or controlling the speech processing apparatus 100 through an authentication process after accessing a speech processing apparatus driving application or speech processing apparatus driving site. In the present embodiment, the user terminal 201 that completes the authentication process may drive the speech processing apparatus 100 and control the operation of the speech processing apparatus 100.

In the present embodiment, the user terminal 201 may be a desktop computer, smartphone, notebook, tablet PC, smart TV, mobile phone, personal digital assistant (PDA), laptop, media player, micro-server, global positioning system (GPS) device, electronic book terminal, digital broadcasting terminal, navigation, kiosk, MP3 player, digital camera, home appliance, and other mobile or immobile computing devices which are operated by an user, but is not limited thereto. In addition, the user terminal 201 may be a wearable terminal having a communication function and a data processing function, such as a watch, glasses, a hair band, and a ring. The user terminal 201 is not limited thereto. Any terminal that is capable of performing web browsing may be used without limitation.

The server 300 may be a database server that provides big data required for applying various artificial intelligence algorithms, and data used for operating the speech processing apparatus 100. Furthermore, the server 300 may include a web server or application server for remotely controlling the speech processing apparatus 100 by using a speech processing apparatus driving application or a speech processing apparatus driving web browser installed in the user terminal 201.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed Specifically, machine learning may be a technology for researching and constructing a system for learning, predicting, and improving its own performance based on empirical data and an algorithm for the same. Machine learning algorithms, rather than only executing rigidly set static program commands, may take an approach that builds models for deriving predictions and decisions from inputted data.

The server 30 may receive the spoken utterance of the user from the speech processing apparatus 100, and convert the spoken utterance into the user utterance text. The server 300 may perform syntactic analysis or semantic analysis on the user utterance text to discover a domain to which the user utterance text belongs and an intent of the user utterance text, and may discover at least one named entity as a result of recognizing a named entity included in the user utterance text. Here, the server 300 may perform a machine learning algorithm to perform the syntactic analysis or semantic analysis on the user utterance text. The server 300 may determine whether the spoken utterance of the user is a complete spoken utterance or an incomplete spoken utterance according to the domain, the intent, and the result of discovering the named entity. When the spoken utterance of the user is incomplete, the server 300 may generate a spoken query utterance that requests information for completing the incomplete spoken utterance as a complete spoken utterance. The server 30 may construct the complete spoken utterance by receiving a spoken response utterance of the user which responds to the spoken query utterance from the speech processing apparatus 100. In the present embodiment, the server 300 may transmit information about the above-mentioned process to the speech processing apparatus 100.

According to a processing capability of the speech processing apparatus 100, at least a portion of the above-mentioned conversion into the user utterance text, the discovery of a domain and an intent, the determination on whether the spoken utterance of the user is a complete spoken utterance or an incomplete spoken utterance, the generation of the spoken query utterance and feeding back the spoken query utterance to the user when the spoken utterance of the user is incomplete, and the reception of the spoken response utterance of the user and completion of the complete spoken utterance may be performed by the speech processing apparatus 100.

The network 400 may serve to connect the electronic device 200 including the speech processing apparatus 100 and the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may send and receive information by using the short distance communication and/or the long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as an Internet and a private network such as a safe corporate private network. The access to the network 400 may be provided via one or more wired or wireless access networks. Further, the network 400 may support 5G communications and/or an Internet of things (IoT) network for exchanging and processing information between distributed components such as objects.

Figure 2:
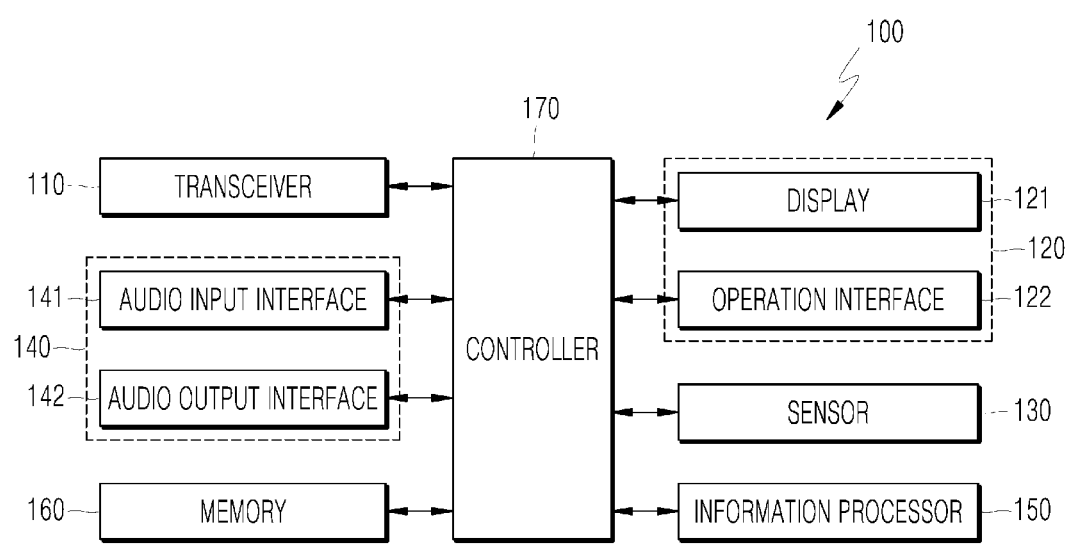
FIG. 2 is a schematic block diagram of a speech processing apparatus according to an embodiment of the present disclosure.

FIG. 2 is a schematic block diagram of a speech processing apparatus according to an exemplary embodiment of the present disclosure. Hereinafter, description overlapping with that of FIG. 1 will be omitted. Referring to FIG. 2, the speech processing apparatus 100 may include a transceiver 110, a user interface 120 including a display 121 and an operation interface 122, a sensor 130, an audio processor 140 including an audio input interface 141 and an audio output interface 142, an information processor 150, a memory 160, and a controller 170.

The transceiver 110 may interwork with the network 400 to provide a communication interface required for providing, in the form of packet data, transmission and reception signals among the speech processing apparatus 100 and/or the electronic device and/or the server 300. Furthermore, the transceiver 110 may serve to receive a predetermined information request signal from the electronic device 200, and may serve to transmit information processed by the speech processing apparatus 100 to the electronic device 200. Furthermore, the transceiver 110 may transmit the predetermined information request signal from the electronic device 200 to the server 300, may receive a response signal processed by the server 300, and may transmit the response signal to the electronic device 200. Furthermore, the transceiver 110 may be a device including hardware and software required for transmitting and receiving signals such as a control signal and a data signal via a wired or wireless connection to another network device.

Furthermore, the transceiver 110 may support a variety of object-to-object intelligent communications, for example, Internet of things (IoT), Internet of everything (IoE), and Internet of small things (IoST), and may support, for example, machine to machine (M2M) communication, vehicle to everything (V2X) communication, and device to device (D2D) communication.

The display 121 of the user interface 120 may display a driving state of the speech processing apparatus 100 under control of the controller 170. Depending on the embodiment, the display 121 may form an inter-layer structure with a touch pad so as to be configured as a touch screen. Here, the display 121 may also be used as the operation interface 122 capable of inputting information through a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electric signals to and from the controller 170. Also, the touch recognition display controller may display a visual output to the user, and the visual output may include text, graphics, images, video, and a combination thereof. The display 121 may be a predetermined display member, such as a touch-sensitive organic light emitting display (OLED), liquid crystal display (LCD), or light emitting display (LED).

The operation interface 122 of the user interface 120 may have a plurality of operation buttons (not shown) to transmit signals corresponding to the buttons to the controller 170. This operation interface 122 may be configured with a sensor, button, or switch structure capable of recognizing a touch or pressing operation of the user. In this embodiment, the operation interface 122 may transmit to the controller 170 an operation signal operated by the user in order to check or modify various information regarding the operation of speech processing apparatus 100 displayed on the display 121.

The sensor 130 may include various sensors configured to sense the condition around of the speech processing apparatus 100. The sensor 130 may include a proximity sensor (not shown) and an image sensor (not shown). The proximity sensor may acquire location data of an object (for example, the user) located around the speech processing apparatus 100 by using infrared rays or the like. Furthermore, the location data of the user acquired by the proximity sensor may be stored in the memory 160.

The image sensor may include a camera (not illustrated) capable of capturing an image of the surroundings of the speech processing apparatus 100, and for image-capturing efficiency, a plurality of cameras may be installed. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image but also a video formed of frames of static images. Meanwhile, the image captured and acquired by the camera serving as the image sensor may be stored in the memory 160.

In this embodiment, the sensor 130 is described as the proximity sensor and the image sensor, but the sensor 130 is not limited thereto. For example, the sensor 130 may include at least one of a lidar sensor, a weight sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environmental sensor (for example, a barometer, a hygrometer, a thermometer, a radiation detection sensor, a heat detection sensor, or a gas detection sensor) and a chemical sensor (for example, an electronic nose, a healthcare sensor, or a biometric sensor). In the present embodiment, the speech processing apparatus 100 may combine various information sensed by at least two of the above-mentioned sensors, and use the combined information.

The audio input interface 141 of the audio processor 140 may receive the utterance information (for example, a wake-up word and a spoken utterance) of the user and transmit the utterance information to the controller 170, and the controller 170 may transmit the utterance information of the user to the information processor 150. To this end, the audio input interface 141 may be provided with one or more microphones (not illustrated). Furthermore, the audio input interface 131 may be provided with a plurality of microphones (not shown) to more accurately receive a spoken utterance. Here, each of the plurality of microphones may be spaced apart from each other at different positions, and may process the received spoken utterance of the user as an electrical signal.

In some embodiments, the audio input interface 141 may use various noise removing algorithms for removing the noise generated during the process of receiving the spoken utterance. In an alternate embodiment, the audio input interface 141 may include various elements configured to process an audio signal, such as a filter (not illustrated) configured to remove noise when the user's spoken utterance is received, and an amplifier (not illustrated) configured to amplify and output a signal outputted from the filter.

The audio output interface 142 of the audio processor 140 may, by control of the controller 170, output a warning sound, a notification message regarding an operation mode, an operation state, and an error state, responding information corresponding to the user's utterance information, and a processing result corresponding to the spoken utterance (a voice command) of the user, in the form of audio. The audio output interface 142 may convert electric signals from the controller 170 into audio signals, and output the audio signals. To this end, the audio output interface 142 may be provided with a speaker or the like.

In a state in which the speech recognition functionality is activated after receiving the wake-up word, the information processor 150 may convert the spoken utterance of the user which includes a voice command into a user utterance text. The information processor 150 may perform syntactic analysis or semantic analysis on the user utterance text to discover a domain to which the user utterance text belongs and an intent of the user utterance text, and may discover at least one named entity as a result of recognizing a named entity included in the user utterance text. The information processor 150 may determine whether the spoken utterance of the user is a complete spoken utterance or an incomplete spoken utterance according to the domain, the intent, and the result of discovering the named entity. When the spoken utterance of the user is incomplete, the information processor 150 may generate a spoken query utterance that requests information for completing the incomplete spoken utterance as a complete spoken utterance, and may feed the spoken query utterance back to the user. The information processor 150 may construct the complete spoken utterance by receiving a spoken response utterance of the user which responds to the spoken query utterance. When the spoken utterance of the user is completed as the complete spoken utterance, the information processor 150 may transmit the complete spoken utterance to the controller 170, and the controller 170 may determine and operate any one electronic device among a plurality of electronic devices in response to the command included in the complete spoken utterance.

In the present embodiment, the information processor 150 may perform training in connection with the controller 170, or may receive training results from the controller 170. In this embodiment, the information processor 150 may be provided outside the controller 170 as illustrated in FIG. 2, or may be provided inside the controller 170 and operate like the controller 170, or may be provided within the server 300 of FIG. 1. Hereinafter, the details of the information processor 150 will be described with reference to FIGS. 3 to 5.

The memory 160, which may store a variety of information required for operating the speech processing apparatus 100 and store control software for operating the speech processing apparatus 100, may include a volatile or non-volatile recording medium. For example, a preset wake-up word for determining the presence of a wake-up word in the spoken utterance of the user may be stored in the memory 160. The wake-up word may be set by a manufacturer. For example, "Hi, LG" may be set as the wake-up word, but the user may change the wake-up word. The wake-up word may be inputted in order to activate the speech processing apparatus 100, and the speech processing apparatus 100 that has recognized the wake-up word uttered by the user may switch to a voice recognition activation state.

Furthermore, the memory 160 may store the utterance information (wake-up word and spoken utterance) of the user received via the audio input interface 141, may store information detected by the sensor 130, and may store information processed by the information processor 150.

Furthermore, the memory 160 may store: a command for converting the user's spoken utterance including a voice command to be executed by the information processor 150, such as a voice command, into a user utterance text; a command for performing syntactic analysis or semantic analysis on the user utterance text to discover the domain to which the user utterance text belongs and the intent of the user utterance text and discover at least one named entity as a result of recognizing a named entity included in the user utterance text; a command for determining whether the user spoken utterance is a complete spoken utterance or an incomplete spoken utterance according to a result of discovering the domain, the intent, and the named entity; a command for generating a spoken query utterance that requests information for completing the incomplete spoken utterance as a complete spoken utterance and feeding the generated spoken query utterance back to the user when the spoken utterance of the user is incomplete; and a command for constructing a complete spoken utterance by receiving a user's spoken response utterance which responds to the spoken query utterance. In addition, the memory 160 may store therein various information that is processed by the information processor 150.

Here, the memory 160 may include a magnetic storage medium or a flash storage medium, but the scope of the present disclosure is not limited thereto. The memory 160 may include a built-in memory and/or an external memory, and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an Xd card, or a memory stick, or a storage device such as a HDD.

Here, relatively simple speech recognition may be performed by the speech processing apparatus 100, and relatively complex speech recognition such as natural language processing may be performed by the server 300. For example, when a word uttered by the user is a preset wake-up word, the speech processing apparatus 100 may switch to a state for receiving a spoken utterance as a voice command. Here, the speech processing apparatus 100 may perform the speech recognition process up to a stage where it is determined whether the wake-up word has been inputted, and the rest of the speech recognition process for the spoken sentence may be performed through the server 300. Since system resources of the speech processing apparatus 100 may be limited, natural language recognition and processing, which are relatively complex, may be performed by the server 300.

The controller 170 may transmit the utterance information received via the audio input interface 141 to the information processor 150, and may provide a speech recognition processing result from the information processor 150 as visual information through the display 121 or as auditory information through the audio output interface 142.

The controller 170 may control the entire operation of the speech processing apparatus 100 by driving the control software stored in the memory 160 as a kind of central processing device. The controller 170 may include any type of device capable of processing data, such as a processor. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

In this embodiment, the controller 170 may perform machine learning such as deep learning on the spoken utterance of the user so as to enable the speech processing apparatus 100 to output an optimal result of the speech recognition processing. The memory 160 may store, for example, data used in the machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Meanwhile, learning of an artificial neural network may be performed by adjusting a weight of a connection line (also adjusting a bias value, if necessary) between nodes so that a desired output is achieved with regard to a given input. Also, the artificial neural network can continuously update the weight values through learning. Furthermore, methods such as back propagation may be used in training the artificial neural network.

As described above, the controller 170 may be provided with an artificial neural network and perform machine learning-based user recognition and user's voice recognition using received audio input signals as input data.

The controller 170 may include an ANN, such as a deep neural network (DNN) including a CNN, an RNN, a DBN, and so forth, and may train the DNN. As a machine learning method for such an artificial neural network, both unsupervised learning and supervised learning may be used. The controller 170, after learning according to the setting, may control such that a speech tone recognition artificial neural network structure is updated.

Figure 3:
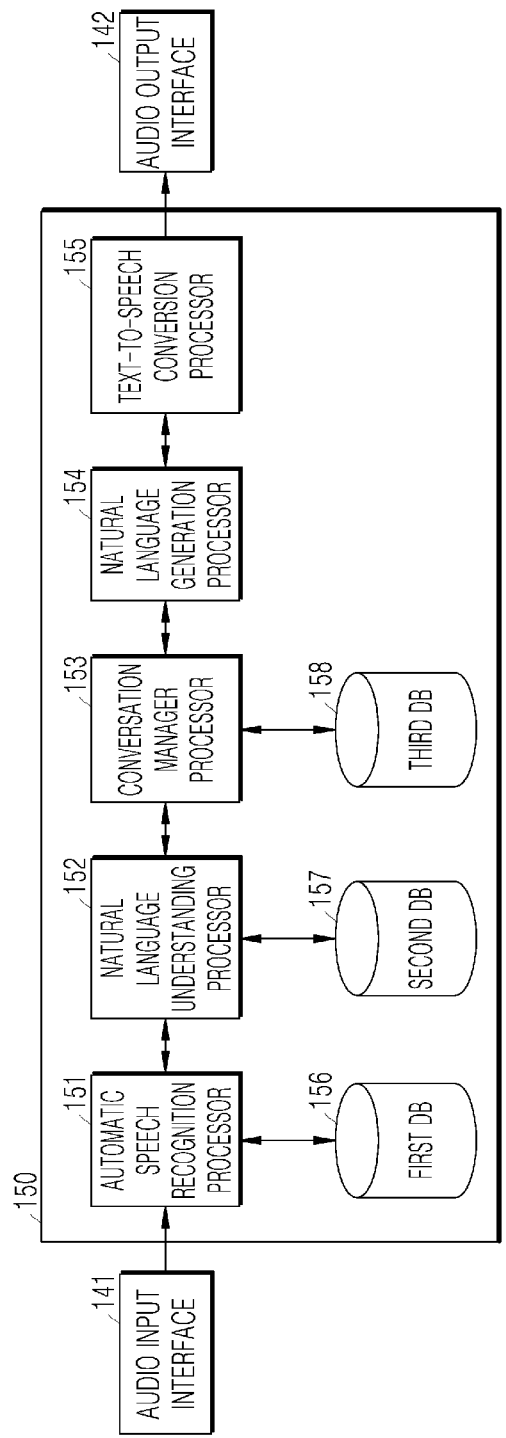
FIG. 3 is a schematic block diagram illustrating an information processor of the speech processing apparatus of FIG. 2 according to an embodiment of the present disclosure.

FIG. 3 is a schematic block diagram illustrating the information processor of the speech processing apparatus of FIG. 2 according to an exemplary embodiment of the present disclosure. Hereinafter, description overlapping with that of FIGS. 1 and 2 will be omitted. Referring to FIG. 3, the information processor 150 may include an automatic speech recognition processor 151, a natural language understanding processor 152, a conversation manager processor 153, a natural language generation processor 154, a text-speech conversion processor 155, and a first database 156, a second database 157, and a third database 158. In an alternative embodiment, the information processor 150 may include one or more processors. In an alternative embodiment, the abovementioned components, from the automatic speech recognition processor 151 to the third database 158, may correspond to one or more processors. In an alternative embodiment, the abovementioned components, from the automatic speech recognition processor 151 to the third database 158, may correspond to software components configured to be executed by one or more processors.

The automatic speech recognition processor 151 may generate a user utterance text obtained by converting a user's spoken utterance including a voice command into text. Here, the user's spoken utterance may include, from the perspective of the user, a voice command for instructing operation of any one electronic device 200 among the plurality of electronic devices 200, but from the perspective of the speech processing apparatus 100 it may include a voice command for operating the plurality of electronic devices 200. For example, when the user's spoken utterance is "turn on", this spoken utterance may be a voice command that instructs the operation of the air conditioner 205 in particular among the plurality of electronic devices 200 from the perspective of the user, but from the perspective of the speech processing apparatus 100 it may be a voice command for operating the plurality of electronic devices 200 including the user terminal 201, the washing machine 203, the robot cleaner 204, and the air conditioner 205.

In the present embodiment, the automatic speech recognition processor 151 may perform speech-to-text (STT) conversion. The automatic speech recognition processor 151 may convert the user spoken utterance inputted through the audio input interface 141 into a user utterance text. In the present embodiment, the automatic speech recognition processor 151 may include an utterance recognizer (not illustrated). The speech recognizer may include an acoustic model and a language model. For example, the acoustic model may include vocalization-related information, and the language model may include unit phoneme information and information about a combination of the unit phoneme information. The speech recognizer may convert the spoken utterance of the user into the user speech text by using information about the unit phoneme information and the vocalization-related information. Information about the acoustic model and language model may be stored in the first database 156, that is, an automatic speech recognition database.

The natural language understanding processor 152 may discover the domain and the intent for the user spoken utterance by performing syntactic analysis or semantic analysis on the user utterance text. Here, the syntactic analysis may divide the user utterance text into syntactic units (for example, words, phrases, and morphemes), and may recognize syntactic elements that the divided units have. In addition, the semantic analysis may be performed using semantic matching, rule matching, formula matching, and the like. In the present embodiment, the domain may include information designating a product type of any one electronic device 200 to be operated by the user. Furthermore, in the present embodiment, the intent may include information indicating how the electronic device 200 included in the domain is to be operated. For example, when the user utterance text reads "decrease the temperature of the air conditioner by 5 degrees", the natural language understanding processor 152 may discover an air conditioner as the domain and temperature decrease as the intent.

Furthermore, the natural language understanding processor 152 may discover at least one named entity as a result of recognizing a named entity for the user utterance text. In order to recognize a named entity, a named entity may be recognized in a rule-based manner using a combined word dictionary and a named entity dictionary stored in the second database 157, and at least one named-entity may be obtained as a result of the recognition. Here, the named entity may represent a noun or number having a unique meaning in a text. The named entity may be divided into a name expression such as a person's name, a place name, or an institution name, a time expression such as a date or a time, and a numerical expression such as an amount of money or a percent. For example, when the text reads "further decrease the air conditioner temperature by 5 degrees", named entities may include an air conditioner, temperature, and 5 degrees.

Furthermore, the natural language understanding processor 152 may determine an essential slot from the user utterance text. Here, when the speech processing apparatus 100 requires several pieces of information in order to give a response to the user utterance text, the several pieces of information may be referred to as essential slots. In the present embodiment, the essential slots may include a first slot, a second slot, and a third slot. The first slot may include a slot related to the domain, the second slot may include a slot related to the intent, and the third slot may include a slot related to an amount-related named entity. For example, when the user utterance text reads "further decrease the air conditioner temperature by 5 degrees", the first slot may include an air conditioner, the second slot may include temperature decrease, and the third slot may include 5 degrees. Furthermore, for example, when the user utterance text reads "further decrease the temperature", it may be understood that the first slot is empty, the second slot includes temperature decrease, and the third slot is empty. Here, the determination of essential slots may also be performed by the conversation manager processor 153 in addition to the natural language understanding processor 152.

In an exemplary embodiment, the natural language understanding processor 152 may use a matching rule stored in the second database 157, that is, a natural language understanding database, in order to discover the domain and the intent. The natural language understanding processor 152 may recognize a meaning of a word (named entity) extracted from the user utterance text using linguistic features (for example, a syntactic element) of a morpheme, a phrase, or the like, and may match the recognized meaning of the word to the domain and the intent in order to discover the intent of the user. For example, the natural language understanding processor 152 may discover the domain and the intent by calculating how many words (named entities) extracted from the user utterance text is included in each domain and intent.

In an exemplary embodiment, the natural language understanding processor 152 may use a statistical model to discover the domain, the intent, and the named entity. The statistical model may refer to various types of machine learning models. In the present embodiment, the natural language understanding processor 152 may refer to a domain classifier to discover the domain, may refer to an intent classifier to discover the intent, and may refer to a named entity recognizer to discover the named entity.

The conversation manager processor 153 may perform overall control of conversations between the user and the speech processing apparatus 100, may determine a query text to be generated using a result of understanding the user utterance text received from the automatic speech recognition processor 152, or may cause the natural language generation processor 154 to generate a language text in the language of the user when generating the query text to feed back to the user.

In the present embodiment, the conversation manager processor 153 may receive the domain, the intent, and the named entity discovered by the natural language understanding processor 152, and thereby determine whether the user spoken utterance is a complete spoken utterance or an incomplete spoken utterance.

The conversation manager processor 153 may determine, from the user utterance text, the essential slots including the first slot related to the domain, the second slot related to the intent, and the third slot related to the amount-related named entity.

The conversation manager processor 153 may determine that the user spoken utterance is a complete spoken utterance when all essential slots are filled with named entities in the user utterance text. For example, when the user utterance text reads "further decrease the air conditioner temperature by 5 degrees", the first slot (air conditioner) related to the domain, the second slot (temperature decrease) related to the intent, and the third slot (5 degrees) related to the amount-related named entity are all filled with named entities, and thus the user spoken utterance may be regarded as a complete spoken utterance.

The conversation manager processor 153 may determine that the user spoken utterance is an incomplete spoken utterance when there is at least one empty essential slot in the user utterance text. For example, when the user utterance text reads "further decrease the temperature", the first slot (air conditioner) and the third slot (5 degrees) are empty, in comparison with the above complete spoken utterance. The above user utterance text, which reads "further decrease the temperature", may thus be regarded as an incomplete spoken utterance lacking two essential slots.

When the user spoken utterance is determined to be incomplete, the conversation manager processor 153 may generate a spoken query utterance that requests information for completing the incomplete spoken utterance as a complete spoken utterance, and may feed the spoken query utterance back to the user.

Here, in order to generate and feed the spoken query utterance back to the user, the conversation manager processor 153 may request the natural language generation processor 154 to generate a query text. The natural language generation processor 154 may generate the query text in response to a query text generation request. The text-speech conversion processor 155 may convert the query text into a spoken query utterance, and may then feed the spoken query utterance back to the user through the audio output interface 142.

In the present embodiment, the conversation manager processor 153 may use a state table pre-established in the third database 158 to request the natural language generation processor 154 to generate the query text. The state table pre-established in the third database 158 may include a required slot in a user command text according to the domain and the intent, and an action state indicating a query text to be requested corresponding to the required slot.

The conversation manager processor 153 may generate, on the basis of the pre-established state table, a query text corresponding to a slot lacking a named entity in the user utterance text. Here, when the number of empty slots is large, the slots lacking a named entity may be determined in an order of the first slot, the second slot, and the third slot.

First, when a named entity is missing in the first slot, the conversation manager processor 153 may generate a query text related to the domain on the basis of the state table. Next, when a named entity is missing in the second slot after the first slot is filled with a named entity, the conversation manager processor 153 may generate a query text related to the intent on the basis of the state table. Lastly, when a named entity is missing in the third slot after the second slot is filled with a named entity, the conversation manager processor 153 may generate a query text related to the third slot on the basis of the state table.

The conversation manager processor 153 may construct the complete spoken utterance by receiving a spoken response utterance of the user which responds to the spoken query utterance. The conversation manager processor 153 may fill essential slots lacking a named entity with a named entity by repeating feedback of the spoken query utterance and reception of the spoken response utterance of the user. Thereafter, the conversation manager processor 153 may obtain, as a complete spoken utterance, the user spoken utterance in which essential slots which lacked a named entity are all filled with a named entity. When the spoken utterance of the user is completed as the complete spoken utterance, the controller 170 may determine and operate any one electronic device 200 among the plurality of electronic devices 200 in response to a command included in the complete spoken utterance.

The natural language generation processor 154 may generate the query text using a knowledge base in response to a request from the conversation manager processor 153. Furthermore, when the operation of the determined electronic device 200 is completed, the natural language generation processor 154 may generate an operation completion text of the electronic device 200.

The text-speech conversion processor 155 may convert the query text generated by the natural language generation processor 154 into the spoken query utterance, and may feed the spoken query utterance back to the user through the audio output interface 142. Furthermore, the text-speech conversion processor 155 may convert the operation completion text of the electronic device 200 generated by the natural language generation processor 154 into an operation completion spoken utterance of the electronic device 200, and may feed the operation completion spoken utterance of the electronic device 200 back to the user through the audio output interface 142.

FIG. 4 is an exemplary diagram for describing an example in which the user's incomplete spoken utterance is completed as a complete spoken utterance in FIG. 3. Hereinafter, descriptions overlapping with those of FIGS. 1 to 3 will be omitted.

Figure 4A:
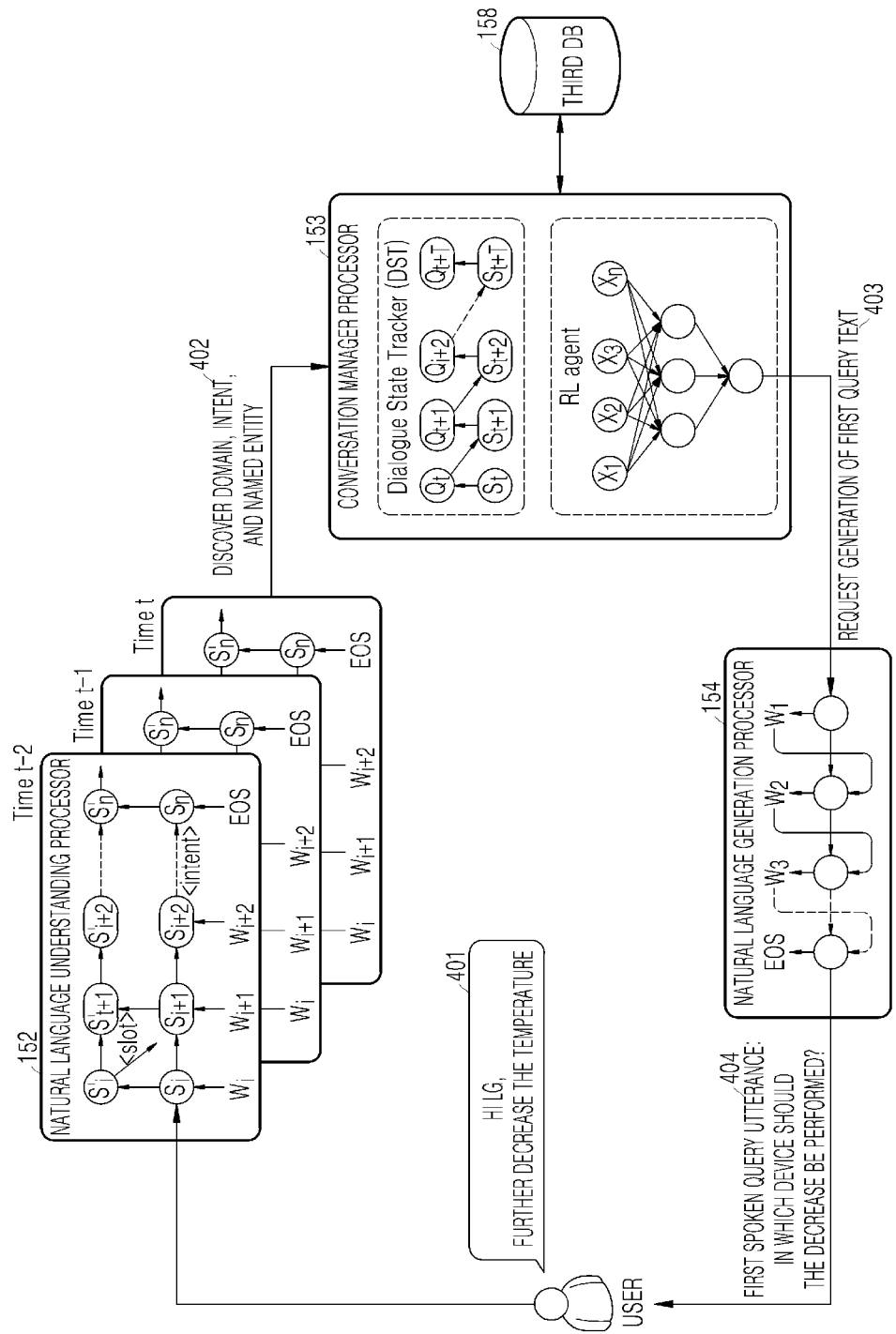
FIGS. 4A, 4B and 4C are exemplary diagrams illustrating an example in which a user's incomplete spoken utterance is completed as a complete spoken utterance in FIG. 3.

Referring to FIG. 4A, utterance information 401, which is the wording "Hi, LG, further decrease the temperature" uttered by the user, may be transferred to the information processor 150 via the audio input interface 141. When conversion of the voice command "further decrease the temperature" into a user utterance text is completed, the user utterance text may be inputted to the natural language understanding processor 152. The natural language understanding processor 152 may perform syntactic analysis or semantic analysis on the user utterance text to discover (402) the domain, the intent, and the named entity.

The conversation manager processor 153 may determine whether the user spoken utterance is a complete spoken utterance or an incomplete spoken utterance, and may request generation of a query text when the user spoken utterance is incomplete. The conversation manager processor 153 may determine that the above user spoken utterance is an incomplete spoken utterance, since the first slot and the third slot are empty in the user utterance text. The conversation manager processor 153 may refer to the pre-established state table to request (403), by priority, generation of a first query text for filling the first slot related to the domain. The natural language generation processor 154 may generate the wording "In which device should the decrease be performed?" as the first query text. The text-speech conversion processor 155 may convert (404) the first query text into a first spoken query utterance, and may feed the first spoken query utterance back to the user through the audio output interface 142.

Figure 4B:
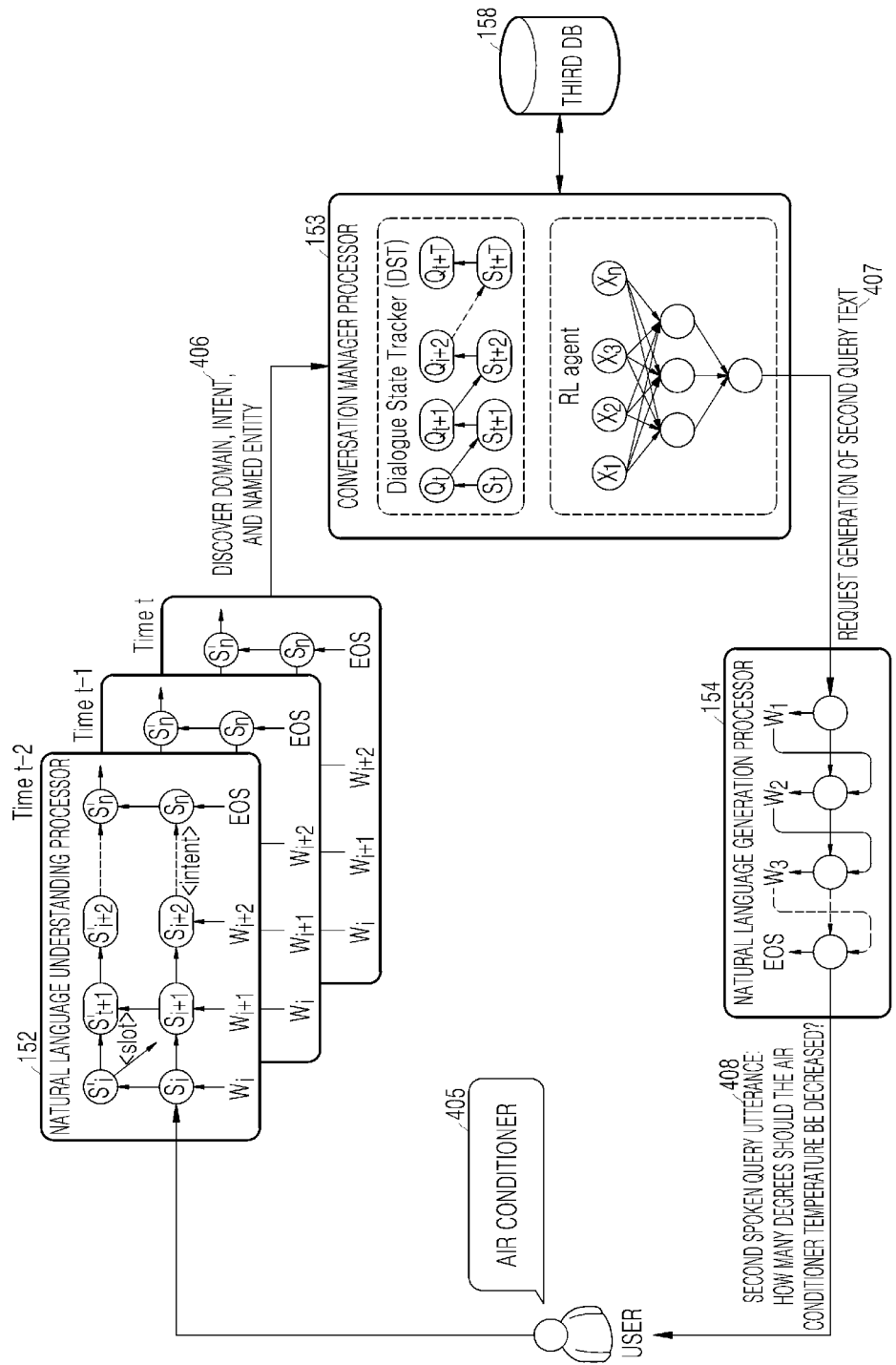

Referring to FIG. 4B, the user who has received the first spoken query utterance may utter (405) the wording "air conditioner" as a spoken response utterance, and this utterance may be converted into a user utterance text and may be inputted to the natural language understanding processor 152. The natural language understanding processor 152 may add (406) a named entity obtained from the current user utterance text ("air conditioner") to the domain, intent, and named entity obtained from the previous user utterance text ("further decrease the temperature").

Although the air conditioner has been obtained as the domain and temperature decrease has been obtained as the intent from the previous and current user utterance texts, the third slot is empty, and thus the conversation manager processor 153 may determine that the above user spoken utterance is an incomplete spoken utterance.

The conversation manager processor 153 may refer to the pre-established state table to request (407) the natural language generation processor 154 to generate a second query text for filling the third slot that indicates a named entity indicating an amount. The natural language generation processor 154 may generate the wording "By how many degrees should the air conditioner temperature be decreased?" as the second query text. The text-speech conversion processor 155 may convert (408) the second query text into a second spoken query utterance, and may feed the second spoken query utterance back to the user through the audio output interface 142.

Figure 4C:
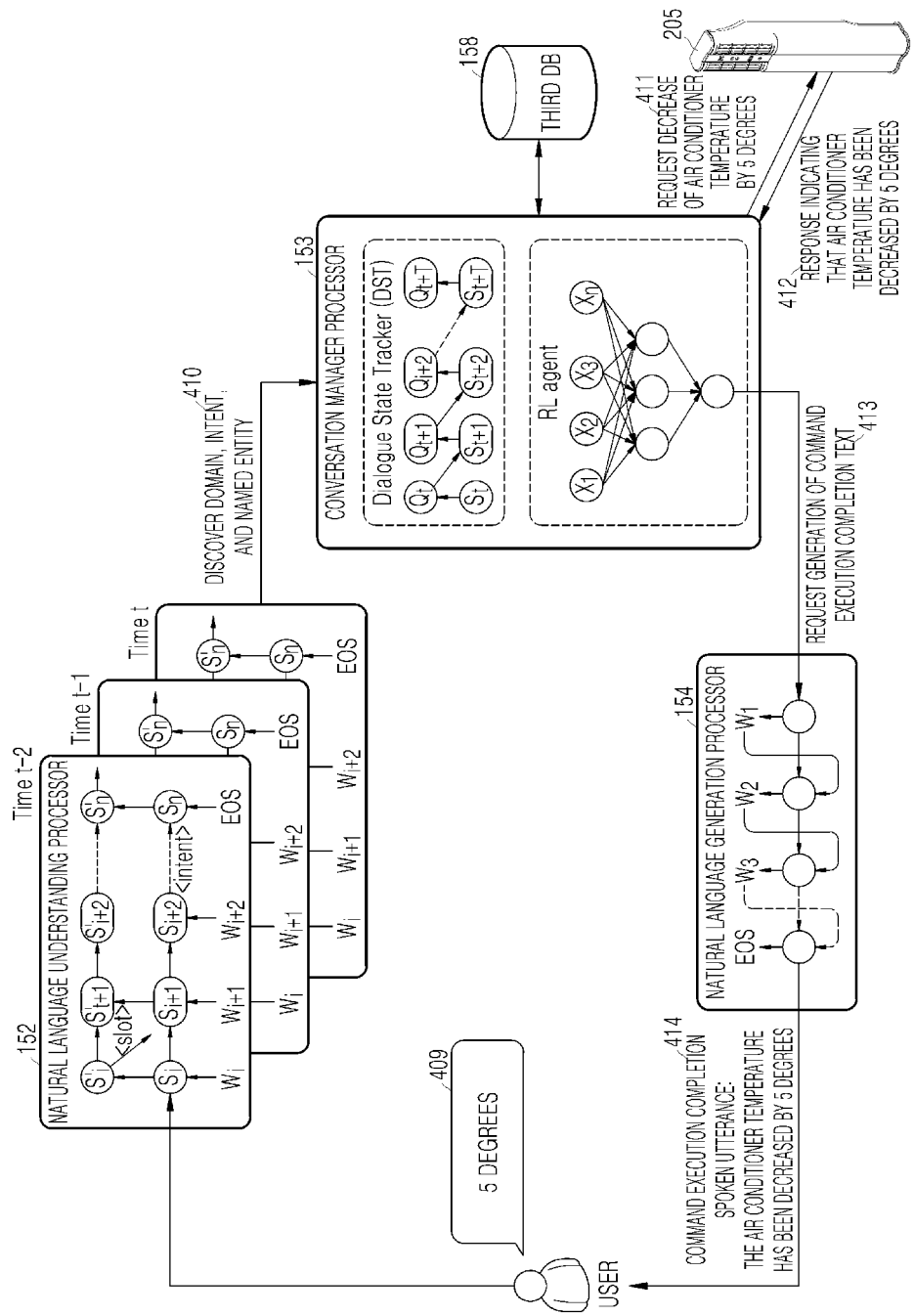

Referring to FIG. 4C, the user who has received the second spoken query utterance may utter (409) the wording "5 degrees" as a spoken response utterance, and this utterance may be converted into a user utterance text and may be inputted to the natural language understanding processor 152. The natural language understanding processor 152 may add (410) a named entity obtained from the current user utterance text ("5 degrees") to the domain, intent, and named entity obtained from the previous user utterance text ("further decrease the air conditioner temperature").

Since the air conditioner has been obtained as the domain, temperature decrease has been obtained as the intent, and 5 degrees has been obtained as the named entity indicating an amount from the previous and current user utterance texts, the conversation manager processor 153 may determine that the above user spoken utterance is a complete spoken utterance in which the essential slots are all filled with named entities.

The conversation manager processor 153 may notify the controller 170 of the completion of the complete spoken utterance, and the controller 170 may determine the air conditioner 205 among the plurality of electronic devices 200 and may request (411) the air conditioner 205 to decrease the temperature by 5 degrees. The controller 170 may receive (412) a response signal indicating that the air conditioner 205 has decreased the temperature by 5 degrees, and may transfer the response signal to the conversation manager processor 153. In response to this response signal, the conversation manager processor 153 may request (413) the natural language generation processor 154 to generate a command execution completion text. The natural language generation processor 154 may generate the wording "The air conditioner temperature has been decreased by 5 degrees" as the command execution completion text. The text-speech conversion processor 155 may convert (414) the command execution completion text into a command execution completion spoken utterance, and may feed the command execution completion spoken utterance back to the user through the audio output interface 142.

FIG. 5 is an exemplary diagram for describing a query text to be fed back through state table matching with regard to the user's incomplete spoken utterance in FIG. 3. Hereinafter, descriptions overlapping with those of FIGS. 1 to 4 will be omitted.

Referring to FIG. 5, 510 represents the types of slots for the user spoken utterance, 520 represents the state table pre-established in the third database 158, and 530 represents a query text to be fed back, which has been generated by the natural language generation processor 154 in response to a request from the conversation manager processor 153. Regarding the types (510) of slots for the user spoken utterance (for example, "further decrease the air conditioner temperature by 5 degrees"), the question mark may indicate an essential slot lacking a named entity, the circle may indicate a slot which has been already filled and is thus meaningless, "Prd" (product) may indicate a state in which the first slot related to the domain is filled with a named entity, "Temp" may indicate a state in which the second slot related to the intent is filled with a named entity, and "Num" may indicate a state in which the third slot related to an amount-related named entity is filled with a named entity.

On the assumption that the user's complete spoken utterance is "further decrease the air conditioner temperature by 5 degrees" in FIG. 5, the essential slots may include an air conditioner (first slot), temperature decrease (second slot), and 5 degrees (third slot). For example, the user spoken utterance may include a first user spoken utterance 511 which reads "further decrease", a second user spoken utterance 512 which reads "further decrease the air conditioner", a third user spoken utterance 513 which reads "further decrease the temperature", a fourth user spoken utterance 514 which reads "further decrease the temperature by 5 degrees", and a fifth spoken utterance 515 which reads "further decrease the air conditioner temperature".

The speech processing apparatus 100 may determine presence of an essential slot lacking a named entity from the first user spoken utterance 511 to the fifth user spoken utterance 515, and may determine that each of the first user spoken utterance 511 to the fifth user spoken utterance 515 is an incomplete spoken utterance.

The speech processing apparatus 100 may determine that the first user spoken utterance 511 is an incomplete spoken utterance since the first slot, the second slot, and the third slot lack a named entity. The speech processing apparatus 100 may determine that the second user spoken utterance 512 is an incomplete spoken utterance since the second slot and the third slot lack a named entity. The speech processing apparatus 100 may determine that the third user spoken utterance 513 is an incomplete spoken utterance since the first slot and the third slot lack a named entity. The speech processing apparatus 100 may determine that the fourth user spoken utterance 514 is an incomplete spoken utterance since the first slot lacks a named entity. The speech processing apparatus 100 may determine that the fifth user spoken utterance 515 is an incomplete spoken utterance since the third slot lacks a named entity.

In a first row 521 of the state table 520, the domain (for example, Prd), having the highest priority, is designated as a required slot according to a plurality of domains (unclear domains: air conditioner/washing machine/TV/smartphone) and a plurality of intents (unclear intents: temperature decrease (Temp_down)/volume decrease (Volume_down)) which may be obtained from the first user spoken utterance 511, and an action state (Request_domain) is designated, which indicates a query text to be requested corresponding to the domain that is a required slot.

In a second row 522 of the state table 520, the intent (for example, Temp), having the next highest priority, is designated as a required slot according to a plurality of intents (unclear intents: temperature decrease (Temp_down)/volume decrease (Volume_down)) which may be obtained from the second user spoken utterance 512, and an action state (Request_intent) is designated, which indicates a query text to be requested corresponding to the intent (Temp, temperature) that is a required slot.

In a third row 523 and fourth row 524 of the state table 520, the domain (for example, Prd) is designated as a required slot according to a plurality of domains (unclear domains: air conditioner/washing machine/TV/smartphone) which may be obtained from the third user spoken utterance 513 and the fourth user spoken utterance 514, and an action state (Request_domain) is designated, which indicates a query text to be requested corresponding to the domain that is a required slot.

In a fifth row 525 of the state table 520, the degree (for example, Num), corresponding to an amount, is designated as a required slot according to a clear domain and a clear intent which may be obtained from the fifth user spoken utterance 515, and an action state (Request_entity) is designated, which indicates a query text to be requested corresponding to the amount (Num) that is a required slot.

The speech processing apparatus 100 may use the action state (Request_domain) of the first row 521 to generate the wording "In which device should the decrease be performed?" as a first query text 531 to be fed back to the user. The speech processing apparatus 100 may use the action state (Request_intent) of the second row 522 to generate the wording "What should be decreased in the air conditioner?" as a second query text 532 to be fed back to the user.

The speech processing apparatus 100 may use the action state (Request_domain) of the third row 523 and fourth row 524 to generate the wording "In which device should the decrease be performed?" as a third query text 533 and a fourth query text 534 to be fed back to the user.

The speech processing apparatus 100 may use the action state (Request_entity) of the fifth row 525 to generate the wording "How many degrees should the air conditioner temperature be decreased?" as a fifth query text 535 to be fed back to the user.

The speech processing apparatus 100 may convert the first query text 531 to the fifth query text 535 into a first spoken query utterance to a fifth spoken query utterance, and feed the first spoken query utterance to the fifth spoken query utterance back to the user. Thereafter, the speech processing apparatus 100 may receive, from the user, a spoken response utterance which responds to the spoken query utterance, and construct a complete spoken utterance based on the received spoken response utterance. If the user spoken utterance is not complete, the feedback of the spoken query utterance and the reception of the user's spoken response utterance may be repeated until the user spoken utterance is completed.

FIG. 6 is a flowchart illustrating a speech processing method according to an exemplary embodiment of the present disclosure. Hereinafter, descriptions overlapping with those of FIGS. 1 to 5 will be omitted.

Referring to FIG. 6, in operation S610, the speech processing apparatus 100 converts a user's spoken utterance including a voice command into a user utterance text. Here, the user's spoken utterance may include, from the perspective of the user, a voice command for instructing operation of any one electronic device 200 among the plurality of electronic devices 200, but from the perspective of the speech processing apparatus 100 it may include a voice command for operating the plurality of electronic devices 200.

In operation S620, the speech processing apparatus 100 may perform syntactic analysis or semantic analysis on the user utterance text to discover a domain to which the user utterance text belongs and an intent of the user utterance text, and may discover at least one named entity as a result of recognizing a named entity included in the user utterance text. The speech processing apparatus 100 may discover the domain designating the product type of an electronic device to be operated by the user, the intent indicating how the electronic device is to be operated, and a named entity including a noun or number having a unique meaning in the user utterance text.

In operation S630, the speech processing apparatus 100 determines whether the spoken utterance of the user is a complete spoken utterance or an incomplete spoken utterance according to the domain, the intent, and the result of discovering the named entity. The speech processing apparatus 100 may determine, from the user utterance text, essential slots including the first slot related to the domain, the second slot related to the intent, and the third slot related to an amount-related named entity. The speech processing apparatus 100 may determine that the user spoken utterance is a complete spoken utterance when the essential slots are all filled with a named entity in the user utterance text, and may determine that the user spoken utterance is an incomplete spoken utterance when an essential slot lacking a named entity is present in the user utterance text.

In operation S640, when the spoken utterance of the user is incomplete, the speech processing apparatus 100 generates a spoken query utterance that requests information for completing the incomplete spoken utterance as a complete spoken utterance, and feeds the spoken query utterance back to the user.

The speech processing apparatus 100 may determine a slot lacking a named entity among required slots in the user utterance text on the basis of a pre-established table including a required slot in a user command text according to the domain and the intent, and a query text to be requested corresponding to the required slot. The speech processing apparatus 100 may generate, on the basis of the state table, the query text corresponding to the slot lacking a named entity. The speech processing apparatus 100 may convert the generated query text into a spoken query utterance and feed the spoken query utterance back to the user.

When determining a slot lacking a named entity, the speech processing apparatus 100 may determine a slot lacking a named entity in an order of the first slot, the second slot, and the third slot, among the required slots in the user utterance text.

When generating a query text, the speech processing apparatus 100 may generate a query text related to the domain when a named entity is missing in the first slot, may generate a query text related to the intent when a named entity is missing in the second slot after the first slot is filled with a named entity, and may generate a query text related to a named entity when a named entity is missing in the third slot after the second slot is filled with a named entity.

In operation S650, the speech processing apparatus 100 receives a spoken response utterance of the user which responds to the spoken query utterance, and constructs the complete spoken utterance based on the received spoken response utterance. The speech processing apparatus 100 may fill essential slots lacking a named entity with a named entity by repeating the feedback of the spoken query utterance and the reception of the spoken response utterance of the user, and may complete, as a complete spoken utterance, the user spoken utterance in which the essential slots lacking a named entity are all filled with a named entity.

Thereafter, when the spoken utterance of the user is completed as the complete spoken utterance, the speech processing apparatus 100 may determine and operate any one electronic device among a plurality of electronic devices in response to a command included in the complete spoken utterance.

Embodiments according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A speech processing method comprising:
    converting a user's spoken utterance comprising a voice command into a user utterance text;
    discovering a domain to which the user utterance text belongs and an intent of the user utterance text by performing syntactic analysis or semantic analysis on the user utterance text, and discovering at least one named entity as a result of recognizing a named entity included in the user utterance text;
    determining whether the user's spoken utterance is a complete spoken utterance or an incomplete spoken utterance according to a result of discovering the domain, the intent, and the named entity;
    based on the user's spoken utterance being an incomplete spoken utterance, generating a spoken query utterance that requests information for completing the incomplete spoken utterance as a complete spoken utterance and feeding the spoken query utterance back to the user by:
    determining a slot lacking a named entity among required slots in the user utterance text based on a pre-established state table comprising a required slot in a user command text according to the domain and the intent, and a query text to be requested corresponding to the required slot;
    generating the query text corresponding to the slot lacking a named entity based on the state table; and
    converting the generated query text into a spoken query utterance and feeding the spoken query utterance back to the user; and
    constructing a complete spoken utterance by receiving a user's spoken response utterance which responds to the spoken query utterance.

2. The speech processing method of claim 1, wherein the converting the user's spoken utterance comprises converting, into the user utterance text, the user's spoken utterance comprising a voice command for instructing operation of any one electronic device among a plurality of electronic devices.

3. The speech processing method of claim 2, wherein the discovering comprises discovering the domain designating a product type of an electronic device to be operated by the user, the intent indicating how the electronic device is to be operated, and the named entity comprising a noun or number having a unique meaning indicated in the user utterance text.

4. The speech processing method of claim 1, wherein the determining comprises:
    determining essential slots comprising a first slot related to the domain, a second slot related to the intent, and a third slot related to an amount-related named entity from the user utterance text;

determining that the user's spoken utterance is a complete spoken utterance when the essential slots are all filled with a named entity in the user utterance text; and determining that the user's spoken utterance is an incomplete spoken utterance when an essential slot lacking a named entity is present in the user utterance text.

5. The speech processing method of claim 1, wherein a first slot among the required slots in the user utterance text is related to the domain, a second slot among the required slots in the user utterance text is related to the intent, and a third slot among the required slots in the user utterance text is related to an amount-related named entity, and wherein the determining a slot lacking a named entity comprises determining the slot lacking a named entity in an order of the first slot, the second slot, and the third slot, among the required slots in the user utterance text.

6. The speech processing method of claim 5, wherein the generating the query text comprises:

generating a query text related to the domain when a named entity is missing in the first slot;

generating a query text related to the intent when a named entity is missing in the second slot after the first slot is filled with a named entity; and generating a query text related to a slot lacking an amount-related named entity when a named entity is missing in the third slot after the second slot is filled with a named entity.

7. The speech processing method of claim 5, wherein the constructing the complete spoken utterance comprises:

filling essential slots lacking a named entity with a named entity by repeating feedback of the spoken query utterance and reception of the user's spoken response utterance; and completing, as the complete spoken utterance, a user's spoken utterance in which the essential slots lacking a named entity are all filled with a named entity.

8. The speech processing method of claim 7, further comprising determining and operating any one electronic device among a plurality of electronic devices in response to a command included in the complete spoken utterance when the user's spoken utterance is completed as the complete spoken utterance.

9. A non-transitory computer-readable recording medium in which a computer program for performing a method using a computer is recorded, wherein the method comprises:

converting a user's spoken utterance comprising a voice command into a user utterance text;

discovering a domain to which the user utterance text belongs and an intent of the user utterance text by performing syntactic analysis or semantic analysis on the user utterance text, and discovering at least one named entity as a result of recognizing a named entity included in the user utterance text;

determining whether the user's spoken utterance is a complete spoken utterance or an incomplete spoken utterance according to a result of discovering the domain, the intent, and the named entity;

based on the user's spoken utterance being an incomplete spoken utterance, generating a spoken query utterance that requests information for completing the incomplete spoken utterance as a complete spoken utterance and feeding the spoken query utterance back to the user by:

determining a slot lacking a named entity among required slots in the user utterance text based on a pre-established state table comprising a required slot in a user command text according to the domain and the intent, and a query text to be requested corresponding to the required slot;

generating the query text corresponding to the slot lacking a named entity based on the state table; and converting the generated query text into a spoken query utterance and feeding the spoken query utterance back to the user; and constructing a complete spoken utterance by receiving a user's spoken response utterance which responds to the spoken query utterance.

10. A speech processing apparatus, comprising one or more processors configured to:

convert a user's spoken utterance comprising a voice command into a user utterance text;

discover a domain to which the user utterance text belongs and an intent of the user utterance text by performing syntactic analysis or semantic analysis on the user utterance text, and discover at least one named entity as a result of recognizing a named entity included in the user utterance text;

determine whether the user's spoken utterance is a complete spoken utterance or an incomplete spoken utterance according to a result of discovering the domain, the intent, and the named entity;

based on the user's spoken utterance being an incomplete spoken utterance, generate a spoken query utterance that requests information for completing the incomplete spoken utterance as a complete spoken utterance and feed the generated spoken query utterance back to the user by:

determining a slot lacking a named entity among required slots in the user utterance text based on a pre-established state table comprising a required slot in a user command text according to the domain and the intent, and a query text to be requested corresponding to the required slot;

generating the query text corresponding to the slot lacking a named entity based on the state table; and converting the generated query text into a spoken query utterance, and feed the spoken query utterance back to the user; and construct a complete spoken utterance by receiving a user's spoken response utterance which responds to the spoken query utterance.

11. The speech processing apparatus of claim 10, wherein the one or more processors are further configured to, when converting the user's spoken utterance including a voice command into a user utterance text, convert, into the user utterance text, the user's spoken utterance comprising a voice command instructing operation of any one electronic device among a plurality of electronic devices.

12. The speech processing apparatus of claim 11, wherein the one or more processors are further configured to, when discovering the domain, the intent, and the named entity, discover the domain designating a product type of an electronic device to be operated by the user, the intent indicating how the electronic device is to be operated, and the named entity comprising a noun or number having a unique meaning indicated in the user utterance text.

13. The speech processing apparatus of claim 10, wherein, when determining whether the user's spoken utterance is a complete spoken utterance or an incomplete spoken utterance, the one or more processors are further configured to:

determine essential slots comprising a first slot related to the domain, a second slot related to the intent, and a third slot related to an amount-related named entity from the user utterance text;

determine that the user's spoken utterance is a complete spoken utterance when the essential slots are all filled with a named entity in the user utterance text; and determine that the user's spoken utterance is an incomplete spoken utterance when an essential slot lacking a named entity is present in the user utterance text.

14. The speech processing apparatus of claim 10, wherein a first slot among the required slots in the user utterance text is related to the domain, a second slot among the required slots in the user utterance text is related to the intent, and a third slot among the required slots in the user utterance text is related to an amount-related named entity, and wherein, when determining a slot lacking a named entity, the one or more processors are further configured to determine the slot lacking a named entity in an order of the first slot, the second slot, and the third slot, among the required slots in the user utterance text.

15. The speech processing apparatus of claim 14, wherein, when generating the query text, the one or more processors are further configured to:

generate a query text related to the domain when a named entity is missing in the first slot;

generate a query text related to the intent when a named entity is missing in the second slot after the first slot is filled with a named entity; and generate a query text related to a slot lacking an amount-related named entity when a named entity is missing in the third slot after the second slot is filled with a named entity.

16. The speech processing apparatus of claim 14, wherein, when constructing the complete spoken utterance, the one or more processors are further configured to:

fill essential slots lacking a named entity with a named entity by repeating feedback of the spoken query utterance and reception of the user's spoken response utterance; and complete, as the complete spoken utterance, a user's spoken utterance in which the essential slots lacking a named entity are all filled with a named entity.

17. The speech processing apparatus of claim 16, wherein the one or more processors are further configured to determine and operate any one electronic device among a plurality of electronic devices in response to a command included in the complete spoken utterance, when the user's spoken utterance is completed as the complete spoken utterance.

* * * * *